United States Patent
Tang et al.

(10) Patent No.: US 11,593,142 B2
(45) Date of Patent: Feb. 28, 2023

(54) CONFIGURATION OPTIMIZATION WITH PERFORMANCE PREDICTION

(71) Applicant: Dell Products L.P., Round Rock, TX (US)

(72) Inventors: Wenwei Tang, Shanghai (CN); Joan Jun Xiong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 16/916,582

(22) Filed: Jun. 30, 2020

(65) Prior Publication Data

US 2021/0382744 A1    Dec. 9, 2021

(30) Foreign Application Priority Data

Jun. 3, 2020 (CN) .......................... 202010494923.2

(51) Int. Cl.
*G06F 9/455* (2018.01)
*G06F 9/4401* (2018.01)
*G06F 11/30* (2006.01)
*G06F 11/34* (2006.01)

(52) U.S. Cl.
CPC ........ G06F 9/45558 (2013.01); G06F 9/4411 (2013.01); G06F 11/3006 (2013.01); G06F 11/3409 (2013.01); *G06F 2009/4557* (2013.01); *G06F 2009/45575* (2013.01); *G06F 2009/45591* (2013.01)

(58) Field of Classification Search
CPC ............... G06F 9/45558; G06F 9/4411; G06F 11/3006; G06F 11/3409; G06F 2009/45591
See application file for complete search history.

(56) References Cited

U.S. PATENT DOCUMENTS

| | | | | |
|---|---|---|---|---|
| 8,825,858 B1* | 9/2014 | Atchity | ................. | H04L 47/822 709/224 |
| 10,909,738 B2* | 2/2021 | Dimitrov | ................ | G06T 17/10 |
| 2009/0217283 A1* | 8/2009 | Anand | .................. | G06F 9/5077 718/104 |
| 2012/0066526 A1* | 3/2012 | Salsbery | ............... | G06F 1/3203 713/320 |
| 2014/0047095 A1* | 2/2014 | Breternitz | ............. | G06F 9/5072 709/224 |
| 2016/0077571 A1* | 3/2016 | Sagar | .................... | G06F 1/3243 713/340 |
| 2016/0077840 A1* | 3/2016 | Khatri | ................... | G06F 9/5094 718/102 |
| 2018/0246762 A1* | 8/2018 | Tarsa | .................... | G06F 9/5083 |

(Continued)

*Primary Examiner* — Benjamin C Wu
(74) *Attorney, Agent, or Firm* — Jackson Walker L.L.P.

(57) ABSTRACT

An information handling system may include at least one processor; and a non-transitory memory coupled to the at least one processor. The information handling system may be configured to: execute a plurality of virtual machines having workloads associated therewith; during selected times, apply a plurality of configuration settings relating to the at least one processor while executing the workloads of the plurality of virtual machines; track a plurality of performance metrics relating to the at least one processor during the selected times; and predictively determine a selected one of the plurality of configuration settings that is predicted to improve performance of the workloads.

17 Claims, 1 Drawing Sheet

(56) References Cited

U.S. PATENT DOCUMENTS

| | | | |
|---|---|---|---|
| 2019/0042310 A1* | 2/2019 | Browne | G06F 1/3209 |
| 2019/0129498 A1* | 5/2019 | Leung | G06F 1/206 |
| 2020/0278870 A1* | 9/2020 | Saravanan | G06F 9/44505 |
| 2021/0208932 A1* | 7/2021 | Park | G06F 9/5027 |
| 2021/0232429 A1* | 7/2021 | Li | G06F 9/541 |
| 2021/0377312 A1* | 12/2021 | Biswas | G06F 21/57 |
| 2021/0389994 A1* | 12/2021 | Malleni | G06F 9/5077 |

* cited by examiner

CONFIGURATION OPTIMIZATION WITH PERFORMANCE PREDICTION

TECHNICAL FIELD

The present disclosure relates in general to information handling systems, and more particularly to optimizing the configuration of information handling systems based on performance predictions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) generally refers to a software-defined IT infrastructure, which typically includes elements such as virtualized computing (e.g., a hypervisor), software-defined storage, and virtualized networking (e.g., software-defined networking).

In a typical virtualization environment, one or more virtual central processing units (vCPUs) are assigned to every virtual machine (VM) within a cloud environment. Each vCPU is seen as a single physical CPU core by the VM's operating system. In some systems, a physical CPU (pCPU) refers to a single physical CPU core or a single logical CPU core (e.g., when hyperthreading or similar technology is enabled). The frequency of the pCPU and number of pCPUs impacts the efficiency of processing resource management.

Some technologies exist for altering the operational characteristics of processors. For example, Intel® Speed Select Technology (SST) introduces methods to allow processors to be configured for a different core count, base frequency, thermal design power (TDP), and Processor Hot (PROCHOT) threshold temperature by choosing a different configuration and core priority.

Due to the nature of virtualization environments, however, it can be a challenge to apply SST and related technologies to dynamically optimize the processing resources in a virtualization environment. Embodiments of this disclosure provide ways of optimizing the configuration based on predictive techniques.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with configuration optimization may be reduced or eliminated.

In accordance with embodiments of the present disclosure, an information handling system may include at least one processor; and a non-transitory memory coupled to the at least one processor. The information handling system may be configured to: execute a plurality of virtual machines having workloads associated therewith; during selected times, apply a plurality of configuration settings relating to the at least one processor while executing the workloads of the plurality of virtual machines; track a plurality of performance metrics relating to the at least one processor during the selected times; and predictively determine a selected one of the plurality of configuration settings that is predicted to improve performance of the workloads.

In accordance with these and other embodiments of the present disclosure, a method may include executing, on an information handling system, a plurality of virtual machines having workloads associated therewith; during selected times, applying a plurality of configuration settings relating to at least one processor of the information handling system while executing the workloads of the plurality of virtual machines; tracking a plurality of performance metrics relating to the at least one processor during the selected times; and predictively determining a selected one of the plurality of configuration settings that is predicted to improve performance of the workloads.

In accordance with these and other embodiments of the present disclosure, an article of manufacture may include a non-transitory, computer-readable medium having computer-executable code thereon that is executable by a processor of an information handling system for: executing a plurality of virtual machines having workloads associated therewith; during selected times, applying a plurality of configuration settings relating to the processor while executing the workloads of the plurality of virtual machines; tracking a plurality of performance metrics relating to the processor during the selected times; and predictively determining a selected one of the plurality of configuration settings that is predicted to improve performance of the workloads.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
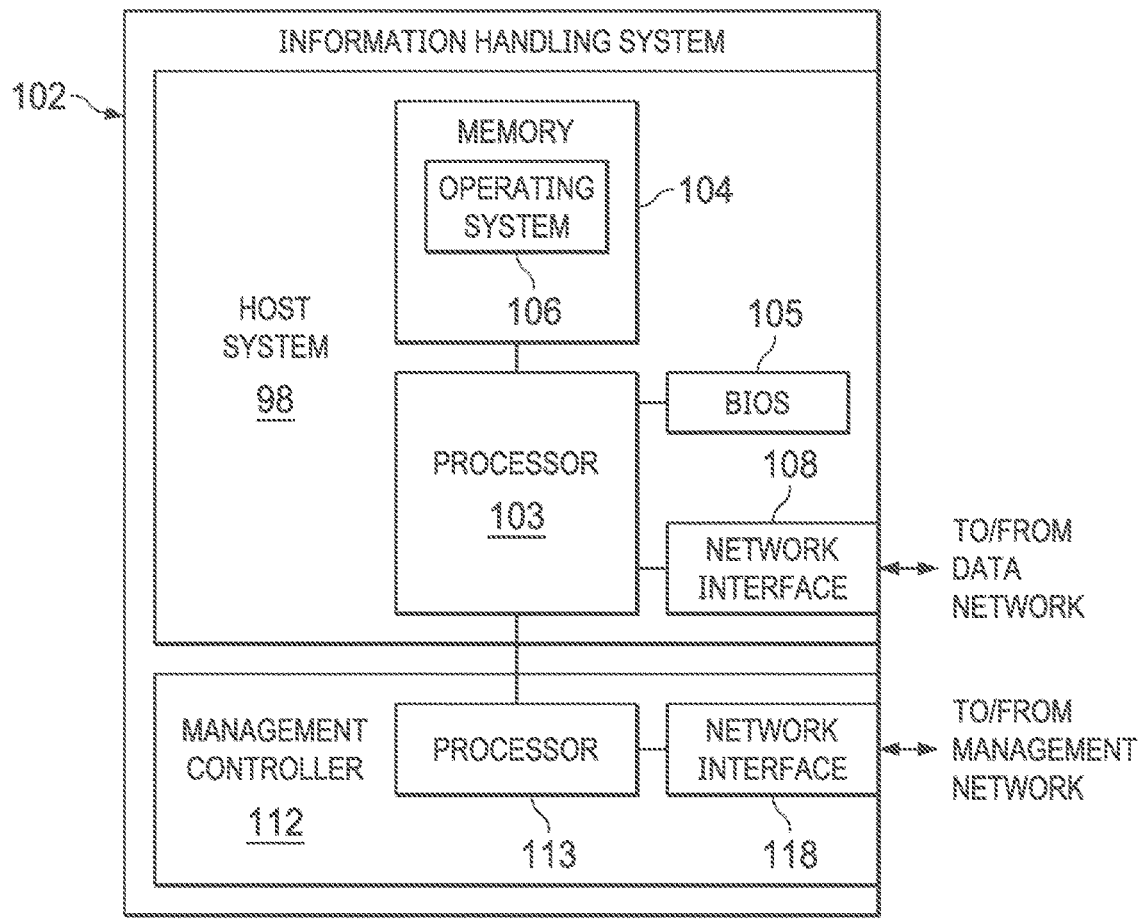
FIG. 1 illustrates a block diagram of an example information handling system, in accordance with embodiments of the present disclosure.
Figure 2:
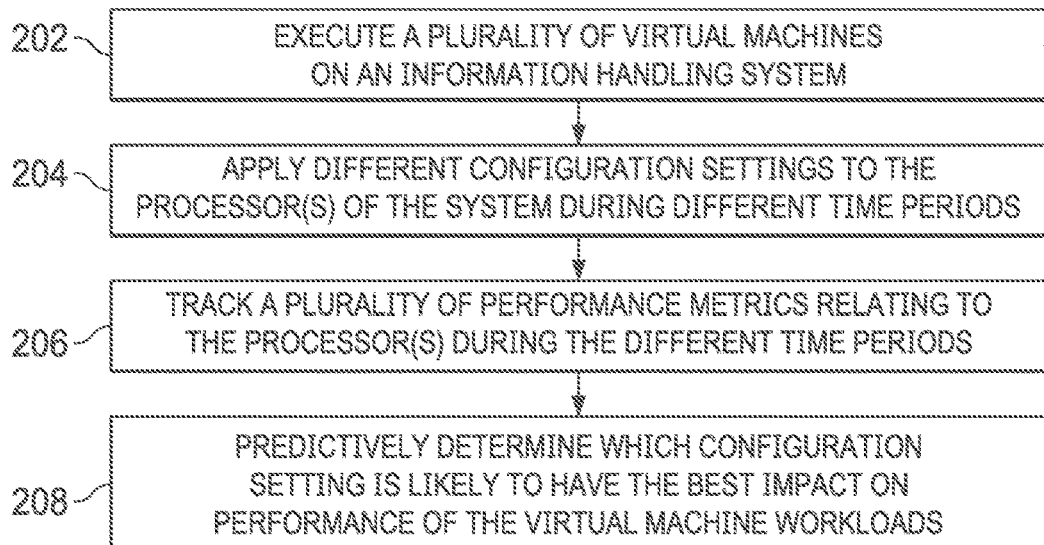
FIG. 2 illustrates an example method, in accordance with embodiments of the present disclosure.

Preferred embodiments and their advantages are best understood by reference to FIGS. 1 through 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to predictively alter the operational characteristics of processors to suit their workload, particularly in virtualization environments such as HCI clusters. Embodiments of this disclosure may provide such a solution by relying on two main components.

First, a workload assessment module for the virtualization environment may provide a way to assess workload execution efficiency/performance during a period of time. Second, a performance-optimized configuration prediction module may provide a method to select a possible new configuration to optimize or improve performance.

As noted above, some embodiments of this disclosure may utilize features of Intel® Speed Select Technology. SST includes two major features, referred to as Performance Profile (SST-PP) and Base Frequency (SST-BF). Both SST-PP and SST-BF can be enabled and configured through the BIOS/UEFI interface and/or through a management controller. A host reboot may be required in some embodiments.

SST-PP introduces two additional configuration levels and a new CPU mailbox command interface. It allows the processor to be configured for a different core count, base frequency, TDP, and PROCHOT temperature by choosing a different configuration.

SST-BF is a performance optimization feature for the base configuration. It allows the capability of providing differentiated levels of base frequency within a system on a chip (SoC). With SST-BF, a particular processor model may be manufactured with specific cores designated as high priority, while other cores are lower priority.

In general, there are a number of metrics of interest with regard to the CPU that may be used to help predict an optimized SST configuration for an information handling system.

For example, CPU Ready on the host ($CR_{host}$) is a type of processing statistic that represents the amount of time that a component is ready to process a job but is waiting on a scheduler for access to a physical processor. From an overall host health standpoint with regard to CPU, this metric is likely the most important gauge. CPU Ready is a metric used to determine the length of time that a virtual machine is waiting for enough physical processors to become available in order to meet the demands of the virtual machine.

CPU Utilization on the host ($CU_{host}$) indicates the overall CPU usage on the host server, which is important because it shows how much work the host server is doing. If the CPU utilization is too high, it might indicate a CPU resource shortage on the host.

CPU Utilization inside virtual machines ($CU_{vm}$) shows vCPU utilization in a virtual machine. Additional vCPUs should be added to a virtual machine when this metric remains at high levels.

To assess the performance of computing resources, all of the above metrics may be leveraged and given proper weights W to produce a performance index within a certain time period (e.g., 1 hour, 1 day, etc.). An initial performance assessment/measurement may be conducted by trying every configuration within an equivalent time period. The performance index may be given by the formula:

$$PI = \frac{(CR_{host} * W_{CRhost}) + (CU_{host} * W_{CUhost}) + (CU_{vm} * W_{CUvm})}{W_{CRhost} + W_{CUhost} + W_{CUvm}}$$

A matrix of the performance index $M_{PI}$ may be constructed based on the different PI values denoted as $PI_{i,j}$ where i indexes the different configurations, and j indexes different time periods during which the measurements are taken.

|          | $T_1$      | $T_2$      | $T_3$      | ... | $T_n$      |
|----------|------------|------------|------------|-----|------------|
| Config 1 | $PI_{1,1}$ | 0          | 0          | ... | 0          |
| Config 2 | 0          | 0          | $PI_{2,3}$ | ... | 0          |
| Config 3 | 0          | $PI_{3,2}$ | 0          | ... | 0          |
| ...      | ...        | ...        | ...        | ... | ...        |
| Config m | 0          | 0          | 0          | ... | $PI_{m,n}$ |

Performance index matrix $M_{PI}$.

For each configuration, the average performance index may be calculated as well. For the m'th configuration, for example, the average performance index may be written as:

$$PI_{m,avg} = \frac{\sum_{i=1}^{N} PI_{m,i} * T_i}{\sum_{i=1}^{N} T_i}$$

where N is the count of performance measurements. The overall average performance index may then also be calculated as:

$$PI_{avg} = \frac{\sum_{j=1}^{M} PI_{j,avg}}{M}$$

With this in mind, a matrix of the performance delta $M_{PD}$ may be also constructed according to the formula:

$$PD_{i,j} = PI_{i,j} - PI_{avg}$$

|  | $T_1$ | $T_2$ | $T_3$ | ... | $T_n$ |
|---|---|---|---|---|---|
| Config 1 | $PD_{1,1}$ | 0 | 0 | ... | 0 |
| Config 2 | 0 | 0 | $PD_{2,3}$ | ... | 0 |
| Config 3 | 0 | $PD_{3,2}$ | 0 | ... | 0 |
| ... | ... | ... | ... | ... | ... |
| Config m | 0 | 0 | 0 | ... | $PD_{m,n}$ |

Performance delta matrix $M_{PD}$.

With this in mind, a matrix of a performance score $M_{PS}$ may be also constructed according to the formula:

$$PS = \frac{\sum_{j=1}^{N} \begin{cases} 1, & \text{if } (PI \geq PI_{avg}) \\ 0, & \text{if } (PI = PI_{avg} \text{ or no measurement}) \\ -1, & \text{if } (PI < PI_{avg}) \end{cases}}{M}$$

|  | $T_1$ | $T_2$ | $T_3$ | ... | $T_n$ |
|---|---|---|---|---|---|
| Config 1 | $PS_{1,1}$ | 0 | 0 | ... | 0 |
| Config 2 | 0 | 0 | $PS_{2,3}$ | ... | 0 |
| Config 3 | 0 | $PS_{3,2}$ | 0 | ... | 0 |
| ... | ... | ... | ... | ... | ... |
| Config m | $PS_{m,1}$ | $PS_{m,2}$ | $PS_{m,3}$ | ... | $PS_{m,n}$ |

Performance score matrix $M_{PS}$.

For each configuration, the formula immediately above may be used to calculate the overall performance score $PS_i$ for the i'th configuration. The average performance score $PS_{avg}$ may also be calculated as:

$$PS_{avg} = \frac{\sum_{j=1}^{M} PS_j}{M}$$

where M is the total number of configurations. Finally, the Hadamard product M* of the matrices $M_{PD}$ and $M_{PS}$ may also be calculated:

|  | $T_1$ | $T_2$ | $T_3$ | ... | $T_n$ |
|---|---|---|---|---|---|
| Config 1 | $PD_{1,1} * PS_{1,1}$ | 0 | 0 | ... | 0 |
| Config 2 | 0 | 0 | $PD_{2,3} * PS_{2,3}$ | ... | 0 |
| Config 3 | 0 | $PD_{3,2} * PS_{3,2}$ | 0 | ... | 0 |
| ... | ... | ... | ... | ... | ... |
| Config m | 0 | 0 | 0 | ... | $PD_{m,n} * PS_{m,n}$ |

Performance score matrix $M_{PS}$.

Based on the above-described performance metrics, various predictions may be made. In the discussion below, for the sake of clarity and exposition, a calculation based on Bayes's theorem is provided. In other embodiments, different algorithms may be used, as one of ordinary skill in the art with the benefit of this disclosure will understand. In this example, based on the performance metrics (which may be collected dynamically), Bayes's theorem may be used to predict the most efficient configuration for the system.

Given a hypothesis H and evidence E, Bayes's theorem states that the relationship between the probability of the hypothesis before getting the evidence P(E) and the probability of the hypothesis after getting the evidence P(H|E) is given by:

$$P(H|E) = \frac{P(E|H)}{P(E)} P(H)$$

P(H) is called the prior probability, while P(H|E) is called the posterior probability. The factor that relates the two, P(E|H))/P(E), is called the likelihood ratio.

Based on Bayes's theorem, the following definitions may be used:

Evidence: applying Configuration i (i=config index).
Hypothesis: h+ (getting a better or equivalent performance index), or h− (getting a worse performance index).
The prediction may be translated to:

$$P(h+|cfg_i) = \frac{P(Cfg_i|h+)}{P(Cfg_i)} P(h+)$$

$P(Cfg_i)$ is the probability of applying configuration i, which may be calculated through the percentage of time period applying that configuration. That is, $$P(Cfg_i) = \frac{T(Cfg_i)}{\sum_{j=1}^{M} T(Cfg_j)}$$

where M is the total number of assessments/measurements. P(h+) is the overall probability of getting a better or equivalent performance index. $P(Cfg_i/h+)$ is the probability of the applying configuration i when getting a better or equivalent performance index, which may in some embodiments be calculated via following algorithm (shown in pseudocode):

numerator=0
denominator=0
for row m in M*:
  for column n in M*:
    if (value of cell$_{m,n}$>0):
      if (m==i):

numerator+=value of cell$_{m,n}$*T$_n$
denominator+=value of cell$_{m,n}$*T$_n$
P(Cfg$_i$|h+)=numerator/denominator The probability of getting better performance when applying a configuration may then be compared as follows:

$$P(h+|Cfg_i): P(h+|Cfg_j) = \frac{P(Cfg_i|h+)}{P(Cfg_i)} : \frac{P(Cfg_j|h+)}{P(Cfg_j)}$$

If a given configuration has higher probability to improve the system's performance, then that configuration may be selected (e.g., via BIOS/UEFI or management controller, for example in the next server maintenance window). Collection of performance data may continue to update the above matrices, which provide the intelligence to predict the most suitable configuration as time goes on.

Thus embodiments of this disclosure provide a method to dynamically predict a performance-optimized configuration for a server system, which shows a way to better utilize technologies such as SST to optimize server hardware utilization, particularly in virtualization environment like HCI.

Turning now to FIG. 2, a flow chart is shown of an example method 200 for optimizing configuration settings, in accordance with some embodiments of this disclosure. At step 202, an information handling system executes a plurality of virtual machines. The virtual machines may have corresponding workloads associated therewith.

At step 204, different configuration settings are applied to the processor(s) of the system during different time periods. For example, a particular SST setting may be applied for a given amount of time, and then a different SST setting may be applied later for the same amount of time, etc.

At step 206, various performance metrics may be tracked during the execution of the workloads of the virtual machines during each time period.

At step 208, a predictive determination is made as to which of the tested configuration settings is likely to provide the best performance in the future. After step 208, the method may end.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a non-transitory memory coupled to the at least one processor;
wherein the information handling system is configured to:
execute a plurality of virtual machines having workloads associated therewith;
during selected times, apply a plurality of configuration settings relating to the at least one processor while executing the workloads of the plurality of virtual machines;
track a plurality of performance metrics relating to the at least one processor during the selected times;
determine a performance index for each configuration setting and the selected time associated therewith, the performance index including a weighted sum of the plurality of performance metrics;
determine a performance delta for each configuration setting and the selected time associated therewith, the performance delta including a difference between an individual performance index and an average performance index;
determine a performance score for each configuration setting, the performance score being indicative of a degree to which an individual performance index differs from the average performance index across all of the selected time periods; and
based on the performance delta and the performance score, predictively determine a selected one of the plurality of configuration settings that is predicted to improve performance of the workloads.

2. The information handling system of claim 1, wherein the performance metrics include CPU Ready on the information handling system (CRhost), CPU Utilization on the information handling system (CUhost), and CPU Utilization on virtual machines (CUvm).

3. The information handling system of claim 1, wherein the plurality of configuration settings comprises a core count, a base frequency, and a turbo frequency.

4. The information handling system of claim 1, wherein the selected times comprise a plurality of equal lengths of time.

5. The information handling system of claim 1, further configured to apply the selected configuration setting.

6. The information handling system of claim 5, wherein the selected configuration setting is applied during a reboot and/or a defined maintenance window.

7. A method comprising:
executing, on an information handling system, a plurality of virtual machines having workloads associated therewith;
during selected times, applying a plurality of configuration settings relating to at least one processor of the information handling system while executing the workloads of the plurality of virtual machines;
tracking a plurality of performance metrics relating to the at least one processor during the selected times;
determining a performance index for each configuration setting and the selected time associated therewith, the performance index including a weighted sum of the plurality of performance metrics;
determining a performance delta for each configuration setting and the selected time associated therewith, the performance delta including a difference between an individual performance index and an average performance index;
determining a performance score for each configuration setting, the performance score being indicative of a degree to which an individual performance index differs from the average performance index across all of the selected time periods; and
based on the performance delta and the performance score, predictively determining a selected one of the plurality of configuration settings that is predicted to improve performance of the workloads.

8. The method of claim 7, wherein the performance metrics include CPU Ready on the information handling system (CRhost), CPU Utilization on the information handling system (CUhost), and CPU Utilization on virtual machines (CUvm).

9. The method of claim 7, wherein the plurality of configuration settings comprises a core count, a base frequency, and a turbo frequency.

10. The method of claim 7, wherein the selected times comprise a plurality of equal lengths of time.

11. The method of claim 7, further comprising applying the selected configuration setting to the information handling system upon a subsequent reboot.

12. An article of manufacture comprising a non-transitory, computer-readable medium having computer-executable code thereon that is executable by a processor of an information handling system for:
executing a plurality of virtual machines having workloads associated therewith;
during selected times, applying a plurality of configuration settings relating to the processor while executing the workloads of the plurality of virtual machines;
tracking a plurality of performance metrics relating to the processor during the selected times;
determining a performance index for each configuration setting and the selected time associated therewith, the performance index including a weighted sum of the plurality of performance metrics;
determining a performance delta for each configuration setting and the selected time associated therewith, the performance delta including a difference between an individual performance index and an average performance index;
determining a performance score for each configuration setting, the performance score being indicative of a degree to which an individual performance index differs from the average performance index across all of the selected time periods; and
based on the performance delta and the performance score, predictively determining a selected one of the plurality of configuration settings that is predicted to improve performance of the workloads.

13. The article of claim 12, wherein the performance metrics include CPU Ready on the information handling system (CRhost), CPU Utilization on the information handling system (CUhost), and CPU Utilization on virtual machines (CUvm).

14. The article of claim 12, wherein the plurality of configuration settings comprises a core count, a base frequency, and a turbo frequency.

15. The article of claim 12, wherein the selected times comprise a plurality of equal lengths of time.

16. The article of claim 12, wherein the code is further executable for:
applying the selected configuration setting.

17. The article of claim 16, wherein the selected configuration setting is applied during a reboot and/or a defined maintenance window.

* * * * *